United States Patent
Ohnishi

(10) Patent No.: US 12,188,761 B2
(45) Date of Patent: Jan. 7, 2025

(54) METHOD FOR MEASURING WAFER PROFILE

(71) Applicant: SHIN-ETSU HANDOTAI CO., LTD., Tokyo (JP)

(72) Inventor: Masato Ohnishi, Nishigo-mura (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 297 days.

(21) Appl. No.: 17/764,379

(22) PCT Filed: Sep. 4, 2020

(86) PCT No.: PCT/JP2020/033514
§ 371 (c)(1),
(2) Date: Mar. 28, 2022

(87) PCT Pub. No.: WO2021/070531
PCT Pub. Date: Apr. 15, 2021

(65) Prior Publication Data
US 2022/0290975 A1    Sep. 15, 2022

(30) Foreign Application Priority Data
Oct. 11, 2019    (JP) .................................. 2019-187838

(51) Int. Cl.
*G01B 11/24* (2006.01)
*G01B 11/30* (2006.01)

(52) U.S. Cl.
CPC .......... *G01B 11/2441* (2013.01); *G01B 11/30* (2013.01); *G01B 2210/56* (2013.01)

(58) Field of Classification Search
CPC ... G01B 11/24; G01B 11/2441; G01B 11/255; G01B 11/30; G01B 11/303;
(Continued)

(56) References Cited

U.S. PATENT DOCUMENTS 5,995,226 A * 11/1999 Abe ..................... G01B 11/306
257/E21.53
6,275,770 B1    8/2001 Latypov
(Continued)

FOREIGN PATENT DOCUMENTS

JP    H11-351857 A    12/1999
JP    2004-20286 A    1/2004
(Continued)

OTHER PUBLICATIONS

Nov. 24, 2020 International Search Report issued in International Application No. PCT/JP2020/033514.
(Continued)

*Primary Examiner* — Uzma Alam
*Assistant Examiner* — Jonathon Cook
(74) *Attorney, Agent, or Firm* — Oliff PLC

(57) ABSTRACT

A method for measuring a wafer profile while holding a periphery of the wafer by using a flatness measurement system, including first and second optical systems respectively located on first and second main surfaces of the wafer, the method including: a first step measuring each surface variation on the main surfaces using one of the optical systems; a second step of calculating a periphery-holding deformation amount, caused by holding the wafer periphery, through utilization of the surface variations measured with the optical system; and a third step of calculating an actual wafer Warp value through subtraction of the periphery-holding deformation amount from a Warp value outputted by the flatness measurement system. This provides a method for measuring a wafer profile to enable measurement of actual wafer Warp value by using a flatness measurement system, and to successfully acquire a Warp value with little influence from a difference among systems.

2 Claims, 6 Drawing Sheets

(58) Field of Classification Search
CPC .............. G01B 11/306; G01B 2210/56; G01B 9/0207; G01B 9/02075
See application file for complete search history.

(56) References Cited

U.S. PATENT DOCUMENTS

| | | |
|---|---|---|
| 6,367,159 B1 | 4/2002 | Naoi et al. |
| 2004/0185662 A1* | 9/2004 | Fujisawa .............. G01B 11/306 |
| | | 438/689 |
| 2005/0255610 A1 | 11/2005 | Sato et al. |
| 2014/0268172 A1* | 9/2014 | Salehpour ............ G01B 11/303 |
| | | 356/511 |

FOREIGN PATENT DOCUMENTS

| | | |
|---|---|---|
| JP | 2007-64748 A | 3/2007 |
| JP | 2008-76269 A | 4/2008 |

OTHER PUBLICATIONS

Apr. 12, 2022 International Preliminary Report on Patentability issued in International Application No. PCT/JP2020/033514.

\* cited by examiner

[FIG. 1]
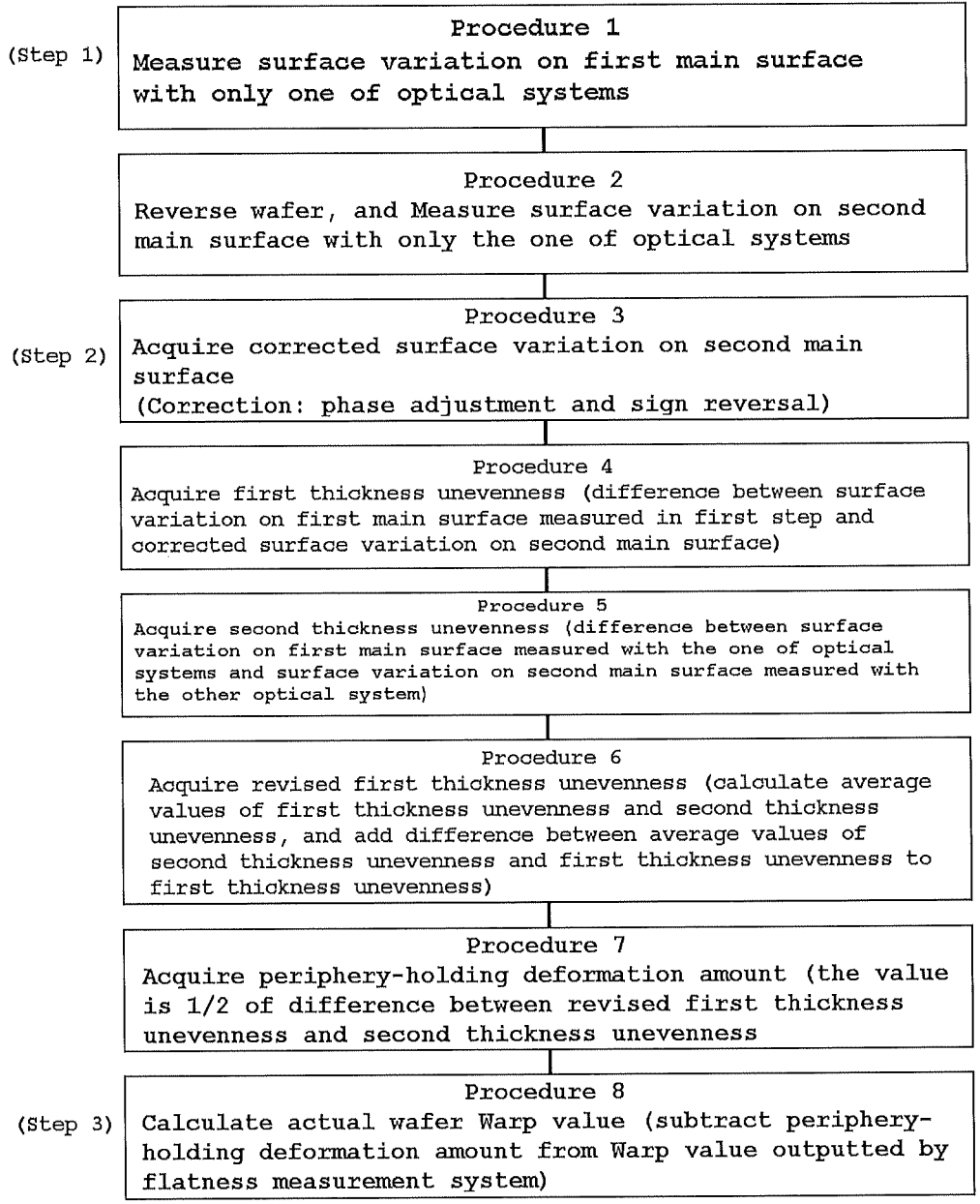

[FIG. 2]
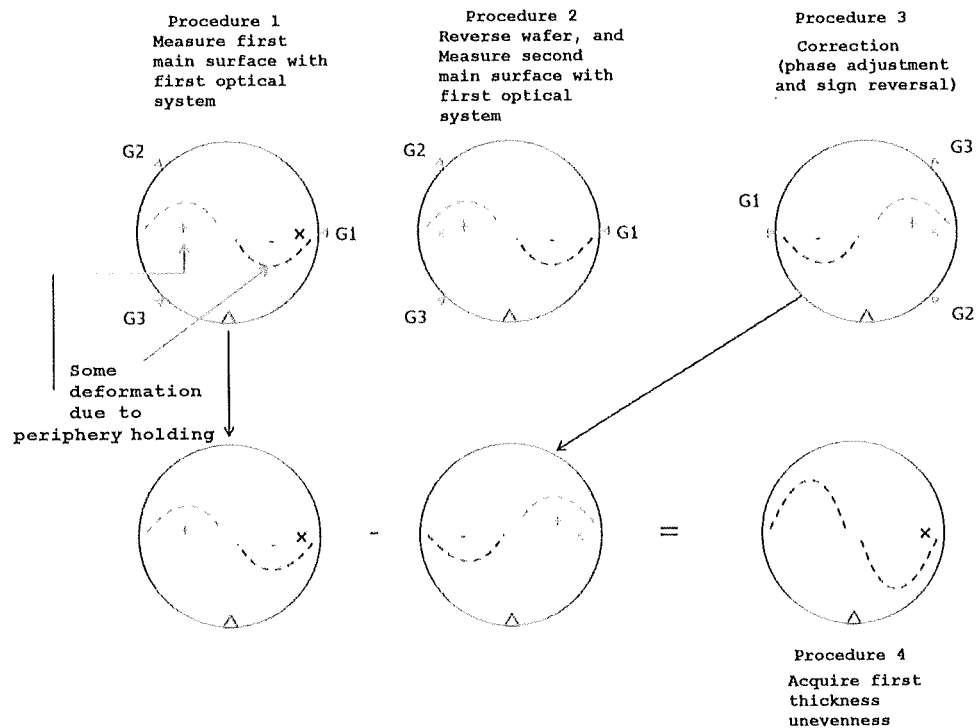
[FIG. 3]
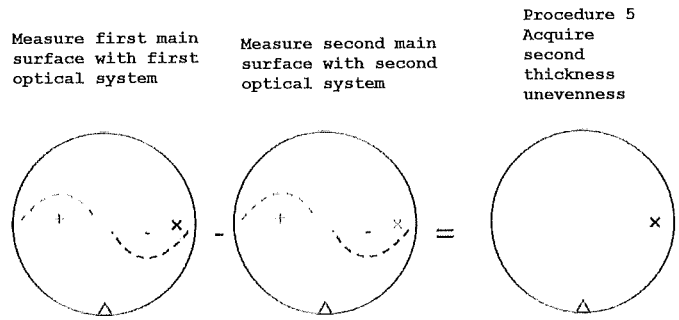

[FIG. 4]
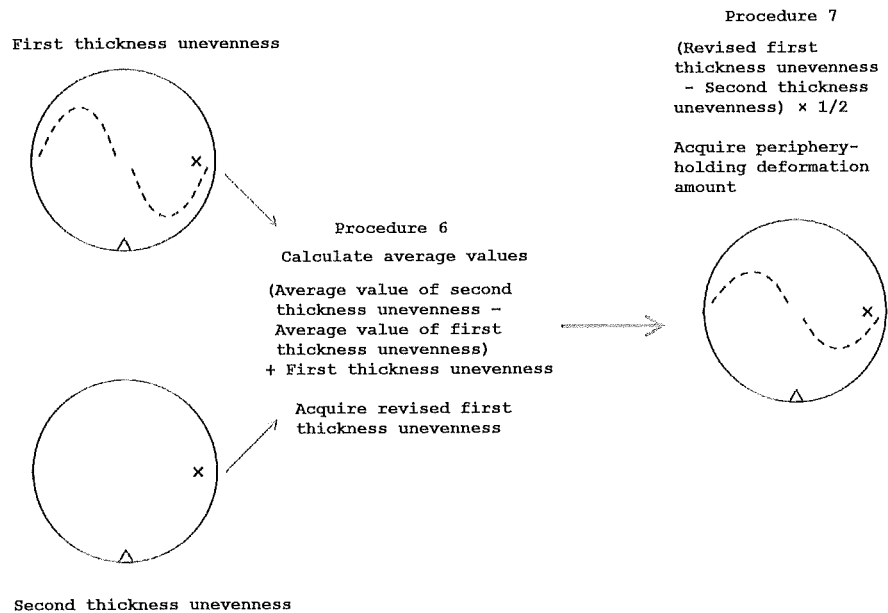
[FIG. 5]
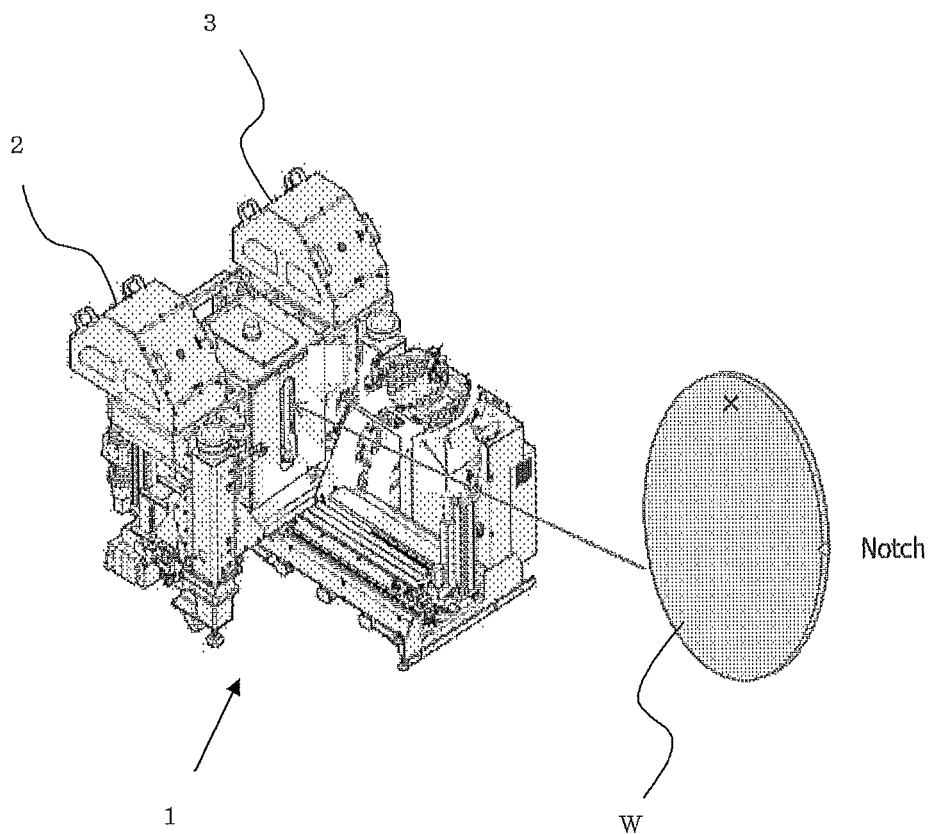

[FIG. 6]
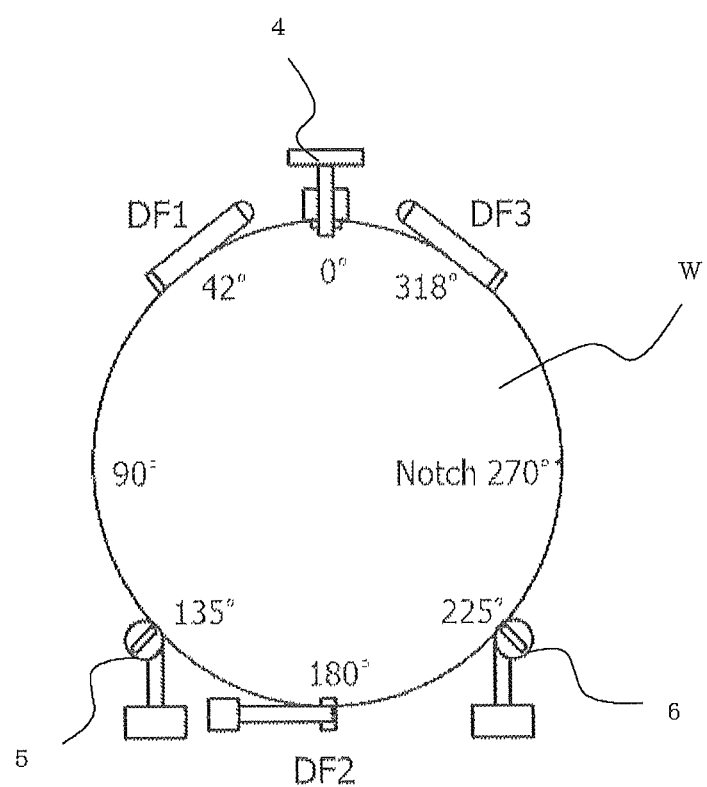

[FIG. 7]
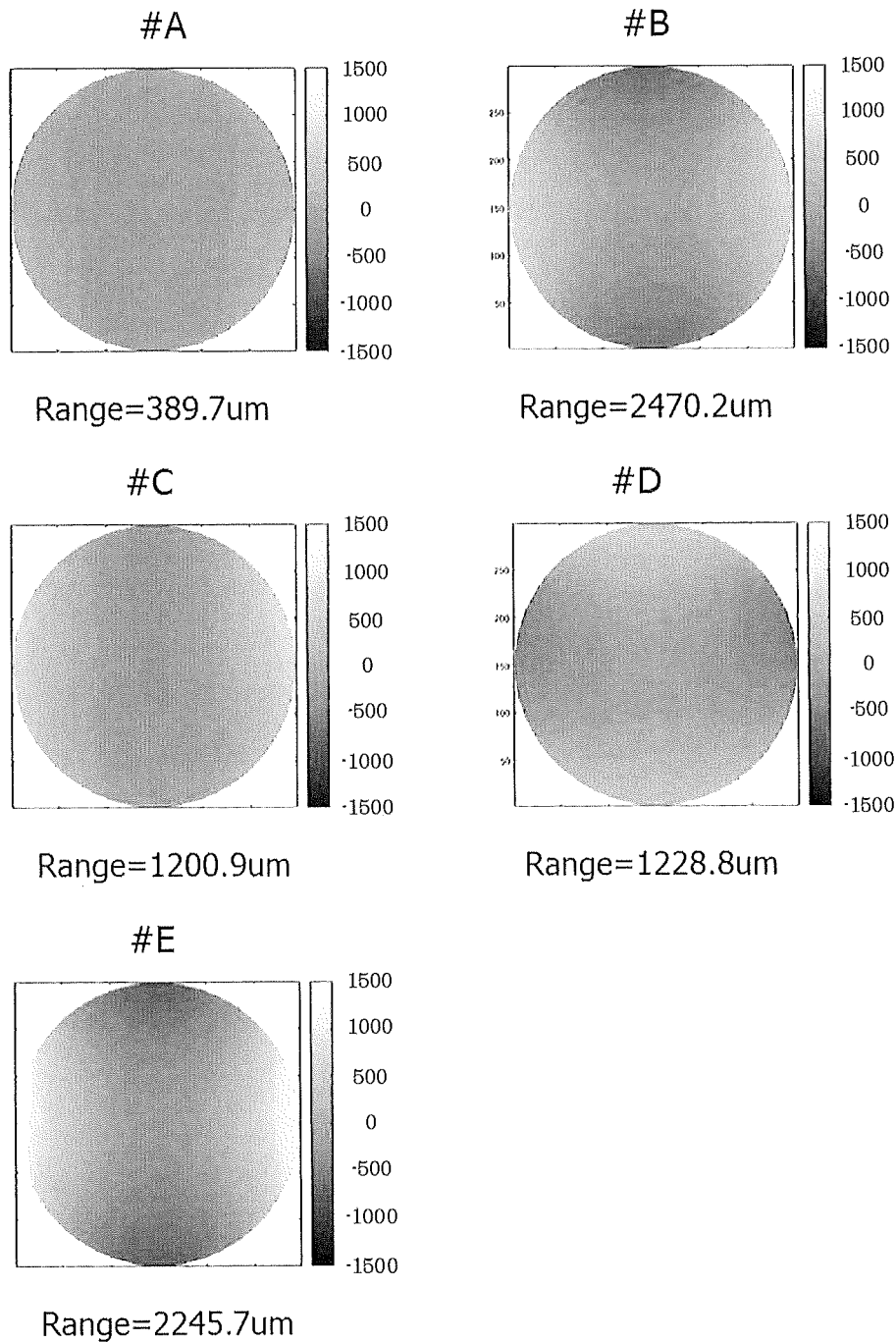

[FIG. 8]
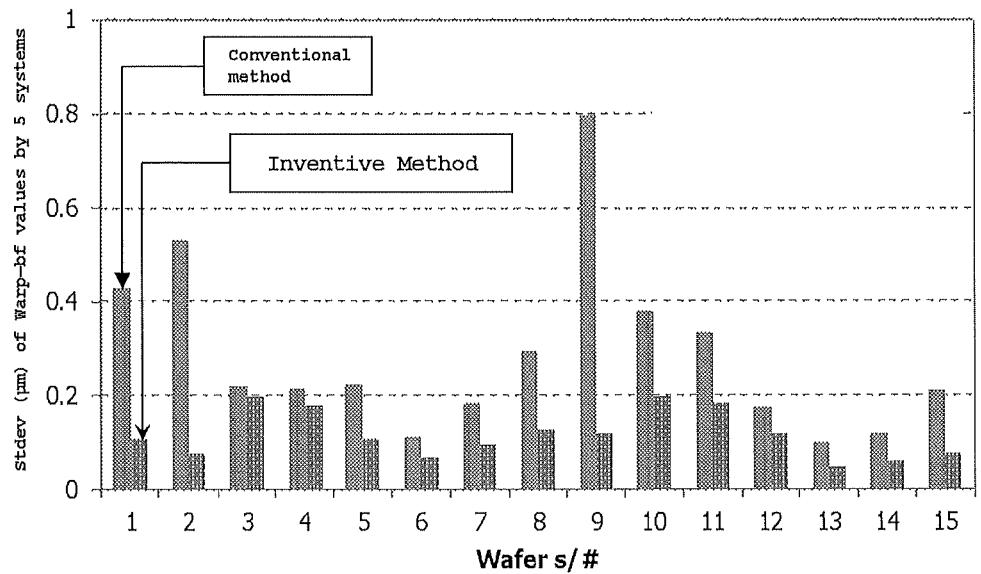
[FIG. 9]
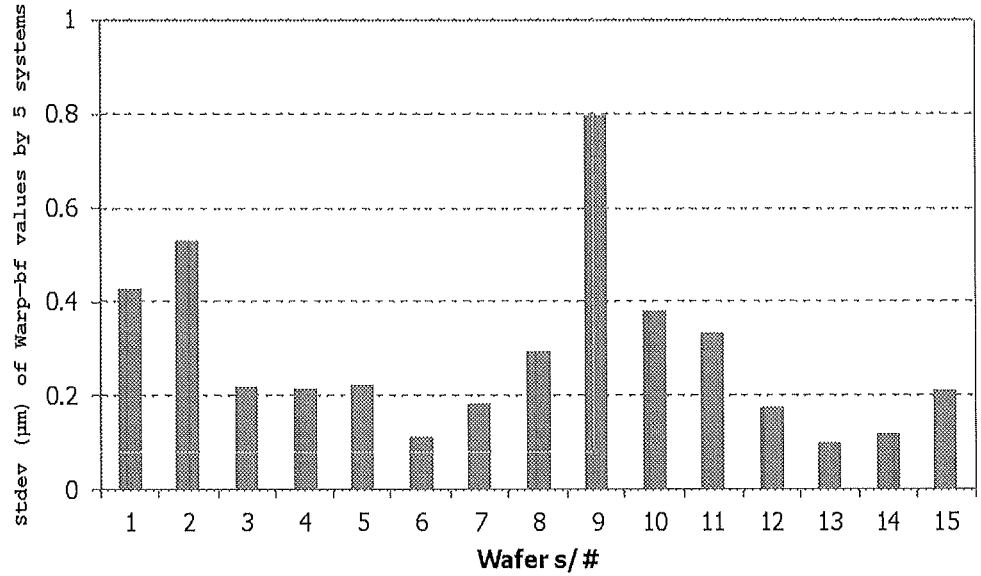

METHOD FOR MEASURING WAFER PROFILE

TECHNICAL FIELD

The present invention relates to a method for measuring a wafer profile by using a wafer flatness measurement system of periphery-holding type.

BACKGROUND ART

As narrower design rules are developed, the demands for quality now include not only the flatness of wafer (thickness unevenness) but also the smoothness of wafer profile (Warp, SORI).

Generally, warp of a wafer is determined as waviness with respect to the thickness central line of the wafer. In this event, the periphery of the wafer is held by a certain method. In WaferSight and AFS available from KLA Tencor, grippers at three locations are mechanically brought into direct contact with chamfered portions of the wafer toward the wafer center to hold a wafer. Hence, depending on the conditions of grippers and how forces are applied to these three points, external force is applied to the wafer, so that the wafer is slightly deformed to have a shape different from the original shape.

Patent Document 1 states in paragraph 44 that the wafer deformation amounts vary among the different supporting positions due to the anisotropic influence from the elastic modulus of silicon single crystal. Nevertheless, Patent Document 1 does not suggest the influence of a difference among measurement systems in this case.

CITATION LIST

Patent Literature

Patent Document 1: JP 2007-64748 A

SUMMARY OF INVENTION

Technical Problem

The deformation by holding the wafer periphery hardly influences the thickness measurement in principle. However, since Warp is a measurement parameter directly related to wafer profile, such deformation influences the reproducibility of measurement values, particularly as difference among systems.

The Warp difference among systems can be expressed by numbers. However, how the holding state deforms a wafer cannot be known. Besides, it is impossible to know the true value of Warp of a wafer to be measured. Hence, there is no way to know which system is reliable.

FIG. 9 shows a difference in Warp measurement value among systems each of which is WaferSight2+ manufactured by KLA Tencor. FIG. 9 is a bar graph of the standard deviation of each of 15 wafers (diameter: 300 mm) having various forms collected from various steps (DSP, CMP, EPW), the standard deviation being obtained by measurement with the five measurement systems. It can be seen that the standard deviations differ among the wafers. Due to synergic effect of the wafer profiles and the periphery holding states of the measurement systems, the difference among the systems regarding Warp value indicative of the surface variation on the wafer profile is not always the same.

The present invention has been made in view of the above problems. An object of the present invention is to provide a method for measuring a wafer profile to enable measurement of actual wafer Warp value by using a flatness measurement system, and to successfully acquire a Warp value which is little influenced from a difference among systems.

Solution to Problem

To achieve the object, the present invention provides a method for measuring a wafer profile while holding a periphery of the wafer by using a flatness measurement system in which the wafer is placed, and which includes a first optical system and a second optical system respectively located on a first main surface and a second main surface of the wafer, the method comprising:

a first step of measuring each of a surface variation on the first main surface and a surface variation on the second main surface of the wafer by using only any one optical system of the first optical system and the second optical system;

a second step of calculating a periphery-holding deformation amount, which is caused by holding the periphery of the wafer, through utilization of the surface variation on the first main surface and the surface variation on the second main surface measured with the one of the optical systems; and a third step of calculating an actual Warp value of the wafer through subtraction of the periphery-holding deformation amount from a Warp value outputted by the flatness measurement system.

Heretofore, a flatness measurement system having a first optical system and a second optical system as described above has been used to measure and output a Warp value while holding the periphery of the wafer. The Warp value includes the periphery-holding deformation amount, so that the actual wafer Warp value is not obtained. In contrast, the inventive method for measuring a wafer profile is capable of obtaining an actual wafer Warp value excluding the periphery-holding deformation amount. Thus, it is possible to obtain a Warp value with little influence from a difference among systems and with high reproducibility.

In this event, in the first step, the wafer is placed into the flatness measurement system to measure the surface variation on the first main surface with only the one of the optical systems, and the surface variation on the second main surface can be measured with only the one of the optical systems such that the wafer is placed into the flatness measurement system while being reversed with respect to a state of the wafer placed to measure the surface variation on the first main surface, and the second step can comprise:
a stage of acquiring a first thickness unevenness of the wafer;
a stage of acquiring a second thickness unevenness of the wafer; and
a stage of acquiring the periphery-holding deformation amount, wherein in the stage of acquiring a first thickness unevenness of the wafer,
the surface variation on the second main surface measured in the first step is corrected to acquire a corrected surface variation on the second main surface, and
the first thickness unevenness is acquired from a difference between the surface variation on the first main surface measured in the first step and the corrected surface variation on the second main surface, in the stage of acquiring a second thickness unevenness of the wafer, the second thickness unevenness is acquired from a difference between the surface variation on the first main surface measured with the one of the optical systems and a surface variation on the second main surface measured with the other optical system, and in the stage of acquiring the periphery-holding deformation amount, an average value of the first thickness unevenness and an average value of the second thickness unevenness are calculated, a difference between the average value of the second thickness unevenness and the average value of the first thickness unevenness is added to the first thickness unevenness to acquire a revised first thickness unevenness, and a value that is ½ of a difference between the revised first thickness unevenness and the second thickness unevenness is set to the periphery-holding deformation amount.

In this way, an actual wafer Warp value excluding the periphery-holding deformation amount can be more surely obtained.

In this event, the wafer profile may be measured by using a plurality of the flatness measurement systems.

Even when multiple flatness measurement systems are used for measurements as described above, an actual wafer Warp value is successfully measured in every measurement. This makes it possible to suppress large system difference among the measured Warp values.

Advantageous Effects of Invention

As described above, the inventive method for measuring a wafer profile makes it possible to eliminate the deformation amount caused by holding the periphery of a wafer in the measurement with a flatness measurement system, and to obtain an actual wafer Warp value. Thus, a Warp value can be obtained without system difference and with high reproducibility.

BRIEF DESCRIPTION OF DRAWINGS

FIG. 1 is a flowchart for illustrating an example of a method for measuring a wafer profile according to the present invention.

FIG. 2 is an explanatory diagram showing a flow of Procedures 1 to 4.

FIG. 3 is an explanatory diagram showing a flow of Procedure 5.

FIG. 4 is an explanatory diagram showing a flow of Procedures 6, 7.

FIG. 5 is a schematic view showing an example of a flatness measurement system usable in the inventive method for measuring a wafer profile.

FIG. 6 is an explanatory view showing an example of a mechanism for holding the periphery of a wafer during measurement.

FIG. 7 shows measurement images illustrating the periphery-holding deformation amounts measured with five flatness measurement systems.

FIG. 8 is a graph showing the standard deviations of Warp—bf values measured with the five flatness measurement systems according to the inventive measurement method (Warp—bf value is a difference between the maximum and minimum values of deviation from a best fit plane of a wafer central plane (thickness center line) (i.e., the best fit plane is calculated from the central plane)).

FIG. 9 is a graph showing the standard deviations of Warp-bf values measured with the five flatness measurement systems according to a conventional method.

DESCRIPTION OF EMBODIMENTS

Hereinafter, embodiments of the present invention will be described with reference to the drawings, but the present invention is not limited thereto.

FIG. 5 shows a flatness measurement system usable in a method for measuring a wafer profile according to the present invention.

As shown in FIG. 5, a flatness measurement system 1 includes a first optical system 2 and a second optical system 3 respectively located on both sides of a wafer W placed in the flatness measurement system 1, the wafer W having a first main surface and a second main surface. The first optical system 2 and the second optical system 3 each include an optical interferometry-based measurement unit. The first optical system 2 is capable of measuring a distance between a sensor and the first main surface of the wafer W, and measuring a surface variation on the first main surface. Meanwhile, the second optical system 3 is capable of measuring a distance between a sensor and the second main surface, and measuring a surface variation on the second main surface. In this manner, the surface variation on the first main surface and the surface variation on the second main surface can be measured separately.

In addition, these first optical system 2 and second optical system 3 can measure a thickness unevenness (thickness distribution (flatness)) of the wafer W and a Warp value of the wafer W.

With a CCD camera, the entire shape of a wafer can be captured, and it is possible to capture an image of the entire surface of a wafer with a pixel size of 0.2 mm×0.2 mm per site. In a case of a wafer with a diameter of 300 mm, approximately 1.76 million pieces of data can be acquired per plane of the wafer.

Further, FIG. 6 shows an example of a mechanism for holding the periphery of a wafer during the measurement.

As shown in FIG. 6, the flatness measurement system 1 has, for example, three grippers 4 to 6. These grippers 4 to 6 hold the periphery of a wafer standing vertically, while the first optical system 2 and the second optical system 3 enable to measure the profile of the wafer W. In this example, the top in a vertical direction is set to 0°, and a notch is located counterclockwise therefrom at 270°. The wafer W (diameter: 300 mm, plane orientation: (100)) is held at three locations of 0°, 135°, and 225° by the grippers 4 to 6.

Note that, in FIG. 6, DF1 to DF3 are tools for suppressing shaking of the wafer W, and are each positioned between two of the three grippers 4 to 6. Nevertheless, DF1 to DF3 are in contact with the wafer W only to the minimum extent, and no force is actively applied to the wafer W. Unlike the grippers 4 to 6, DF1 to DF3 are not holders.

Specific examples of the flatness measurement system 1 as described above include Wafersight and AFS available from KLA Tencor, etc. It is a matter of course that the examples are not limited to these.

Next, the inventive method for measuring a wafer profile by using the flatness measurement system 1 as described above will be described.

FIG. 1 shows an example of a flow of the inventive measurement method.

The inventive method includes: a first step of measuring each of a surface variation on the first main surface and a surface variation on the second main surface of the wafer W by using only any one optical system of the first optical system 2 and the second optical system 3; a second step of calculating a periphery-holding deformation amount, which is caused by holding the periphery of the wafer W, through utilization of the surface variations on the first and second main surfaces thus measured; and a third step of calculating an actual wafer Warp value through subtraction of the periphery-holding deformation amount from a Warp value outputted by the flatness measurement system.

Here, the significance of the first step will be described at first. Suppose that when some amount of deformation attributable to periphery holding (periphery-holding deformation amount) exists on the wafer W, ordinary measurement according to a conventional measurement method is performed (the surface variation on the wafer first main surface is measured with the first optical system 2, the surface variation on the wafer second main surface is measured with the second optical system 3). In this case, according to the way of the thickness calculation, the influence from the profile change caused by holding the periphery of the wafer W does not appear in the parameter (thickness unevenness of the wafer W) obtained from the measured surface variations. This is because in the aforementioned ordinary measurement, when the front and back surfaces (the first main surface and the second main surface) of the wafer are measured with different optical systems (the first optical system and the second optical system), the deformation amount in the wafer profile due to the holding scheme and the original waviness on the wafer profile are cancelled through computation of the difference between the front and back, and cannot be detected by the conventional measurement method.

In contrast, when the wafer first main surface and the wafer second main surface are measured with only one of the optical systems as in the present invention, the influence from the wafer deformation due to wafer holding is incorporated and remains in the parameter (thickness unevenness (thickness distribution)). Thus, the periphery-holding deformation amount can be extracted from the parameter, and subtracted from a Warp value (raw Warp value) measured by the measurement system. In this way, the present inventor has found that an actual wafer Warp value can be easily obtained with little influence from the periphery-holding deformation amount.

Hereinafter, each step will be described in detail.

<First Step>

As noted above, only any one optical system of the first optical system 2 and the second optical system 3 is used to measure each of the surface variation on the first main surface and the surface variation on the second main surface of the wafer W. Note that it is also possible to use only the second optical system 3 for the measurement, although only the first optical system 2 is used for the measurement in the example herein. Hereinbelow, this measurement procedure will be described as an example.

FIG. 2 is an explanatory diagram showing a flow of the following Procedures 1 to 4.

First, a wafer is placed into the flatness measurement system to measure the surface variation on the first main surface by using only one of the optical systems (Procedure 1).

Here, the surface variation of the first main surface of the wafer W is measured with the first optical system 2.

Next, the surface variation on the second main surface is measured by using only the one of the optical systems such that the wafer is placed into the flatness measurement system while being reversed with respect to a state of the wafer placed to measure the surface variation on the first main surface (Procedure 2).

Here, the same wafer W is reversed, and the surface variation of the second main surface of the wafer W is measured with the first optical system 2. As described above, the wafer W is reversed from the state of the wafer W placed in the measurement of the surface variation on the first main surface. The wafer W in the reversed state is placed and measured with the first optical system 2 as in the case of the first main surface.

<Second Step>

The second step roughly includes: a stage of acquiring a first thickness unevenness of the wafer; a stage of acquiring a second thickness unevenness of the wafer; and a stage of acquiring a periphery-holding deformation amount.

(Stage of Acquiring First Thickness Unevenness)

The surface variation on the second main surface measured in the first step is corrected to acquire a corrected surface variation on the second main surface (Procedure 3).

First, the surface variation of the second main surface of the wafer W measured in the first step is represented in an r-theta coordinate system, and a deviation of the r-theta coordinates due to the reversal of the wafer W in the first step is corrected. Since the wafer is reversed, the phase of the surface variation of the second main surface in the r-theta coordinate system is different from that of the first main surface. Thus, the phase is adjusted. Specifically, the phase is adjusted so that the surface variation of the second main surface is positioned as seen from the side of the first main surface. To be more specific, the surface variation of the second main surface measured in the first step is reversed around a rotation axis, which corresponds to the rotation axis during the reversal in the second main surface measurement of the first step. The reversals in the first step and here may be performed based on a notch of the wafer W, or the like.

Further, a correction is performed to reverse the sign of the surface variation.

Thereby, the relation of the surface variation on the second main surface in the r-theta coordinates and the state of the surface variation become as seen from the first main surface side of the wafer (corrected surface variation on the second main surface).

Next, the first thickness unevenness is acquired from a difference between the surface variation on the first main surface measured in the first step and the corrected surface variation on the second main surface (Procedure 4).

Basically, as will be described for the following Procedure 5, a thickness unevenness of the wafer W is obtained through subtraction of (the surface variation on the first main surface measured with the first optical system 2)—(the surface variation on the second main surface measured with the second optical system 3) according to the ordinary measurement. In contrast, the subtraction of (the surface variation on the first main surface measured in the first step)—(the corrected surface variation on the second main surface) according to the present invention is mere a subtraction between the surface variations obtained from only the first optical system 2. Accordingly, a tentative thickness unevenness not including information on absolute thickness is calculated.

(Stage of Acquiring Second Thickness Unevenness)

Next, the second thickness unevenness is acquired from a difference between the surface variation on the first main surface measured with the one of the optical systems and a surface variation on the second main surface measured with the other optical system (Procedure 5). FIG. 3 is an explanatory diagram showing a flow of Procedure 5.

As described above, the first thickness unevenness cannot be described as actual wafer thickness unevenness. Hence, in order to acquire a thickness unevenness measured with only the first optical system 2 in Procedure 6 to be described later, here, first, according to the ordinary measurement method, a thickness unevenness of the wafer (second thickness unevenness) is measured with both of the first optical system 2 and the second optical system 3 by a standard method (conventional ordinary measurement method) of the measurement system in itself. Specifically, here, the surface variation on the second main surface measured with the second optical system 3 is subtracted from the surface variation on the first main surface measured with the first optical system 2 to obtain the second thickness unevenness.

Note that the measurements of the surface variation on the first main surface with the first optical system 2 and the surface variation on the second main surface with the second optical system 3 may be performed in this event, or may be performed in advance to acquire these surface variations beforehand. For example, these measurements may be performed in Procedure 1.

(Stage of Acquiring Periphery-Holding Deformation Amount)

FIG. 4 is an explanatory diagram showing a flow of the following Procedures 6, 7.

An average value of the first thickness unevenness and an average value of the second thickness unevenness are calculated, and a difference between the average value of the second thickness unevenness and the average value of the first thickness unevenness is added to the first thickness unevenness to acquire a revised first thickness unevenness (Procedure 6).

As described in the section for Procedure 5, a thickness unevenness measured with only the first optical system 2 is acquired in this Procedure 6. First, an average value of the first thickness unevenness and an average value of the second thickness unevenness are calculated. For example, if the pixel size per site is 0.2 mm×0.2 mm as described above, each of the first thickness unevenness and the second thickness unevenness has a collection of approximately 1.76 million pieces of thickness data per plane of a wafer, provided that the water has a diameter of 300 mm. The average value of the first thickness unevenness and the average value of the second thickness unevenness each mean an average value of such data.

Then, in order that the average value of the first thickness unevenness (average thickness) is equal to the average value of the second thickness unevenness (average thickness), a value obtained by subtracting the average value of the first thickness unevenness from the average value of the second thickness unevenness is added to the data on the entire plane of the first thickness unevenness to thus acquire the thickness unevenness measured with only the first optical system 2 (revised first thickness unevenness) whose average value is equal to that of the second thickness unevenness.

Next, a value that is ½ of a difference between the revised first thickness unevenness and the second thickness unevenness is set to be the periphery-holding deformation amount (Procedure 7).

In this manner, the second thickness unevenness is subtracted from the revised first thickness unevenness, and the difference is multiplied by ½. Thereby, only the deformation amount attributable to the periphery holding can be extracted and obtained quantitatively.

<Step 3>

An actual wafer Warp value is calculated through subtraction of the periphery-holding deformation amount from a Warp value outputted by the flatness measurement system (Procedure 8).

In this manner, the calculated periphery-holding deformation amount is subtracted from a raw Warp value (including the wafer deformation due to the periphery holding) which is outputted directly from the flatness measurement system 1. Warp is an indicator for knowing the maximum difference between the thickness center line in a wafer cross section and a best fit plane of the entire wafer or a best fit plane calculated from predetermined three points. The raw Warp value from the flatness measurement system 1 is automatically calculated on the basis of the state including the influence of periphery holding deformation. Thus, in order to exclude such extra influence, the periphery-holding deformation amount is subtracted from the raw Warp value as in Procedure 8. Thereby, a Warp value (from which the periphery-holding deformation amount is eliminated) can be acquired, which is approximately the true value. This makes it possible to narrow a difference among measurement systems regarding a Warp value, the difference being caused by periphery holding deformation.

Note that specific procedures in Steps 1 and 2 are not limited. Nevertheless, substantially true Warp value can be obtained further reliably when periphery-holding deformation amount is obtained by methods including Procedures 1 to 7.

Conventionally, when multiple flatness measurement systems are used for the measurement, the deformation amounts attributable to the periphery holding by grippers in the measurement systems are reflected as difference among the systems. In contrast, the present invention as described above makes it possible to exclude the periphery-holding deformation amount causing such difference among systems, and thus can improve and reduce the difference among systems. Accordingly, even when multiple measurement systems are employed, it is possible to suppress a wide variation of Warp values among the measurement systems.

EXAMPLE

Hereinafter, the present invention will be specifically described with reference to Example and Comparative Example. However, the present invention is not limited thereto.

Comparative Example

With multiple (here, five) flatness measurement systems (#A to #E), the Warp values of 15 wafers each having a diameter of 300 mm and collected from DSP, CMP, and EPW processes were measured by the conventional normal measurement method. Consequently, the obtained result was similar to that in FIG. 9. As shown in this graph of the standard deviations of the Warp values due to the difference among the systems, the standard deviations varied in all the wafers by the synergic effect of the wafer profiles and the periphery holding states. As the difference among the systems, the standard deviation of the Warp value was as high as about 0.8 µm at maximum.

EXAMPLE

Here, to verify the effectiveness of the present invention, the same 15 wafers and the same five flatness measurement systems as in the case of FIG. 9 were used for the measurements according to the flow of the inventive measurement method shown in FIG. 1.

FIG. 7 shows measurement images illustrating the periphery-holding deformation amounts obtained from the five flatness measurement systems. "Range" shows the maximum difference of various periphery-holding deformation amounts in a wafer plane. It can be understood that the system #A had the smallest periphery-holding deformation amount (Range=389.7 μm), and that the system #B had the largest periphery-holding deformation amount (Range=2470.2 μm).

Such periphery-holding deformation amounts were calculated for all of the wafers and the measurement systems, and subtracted from raw Warp values from the measurement systems to calculate true Warp values.

FIG. 8 shows the standard deviations of the true Warp values of the wafers thus calculated among the measurement systems. Note that the graph bars of FIG. 9 are also shown to facilitate the comparison with the result of the conventional method. The graph bars on the left are of the conventional method, while the graph bars on the right are of the present invention.

The inventive measurement method reduced and improved the standard deviations of the Warp values among the measurement systems, clearly demonstrating the effect of narrowing the difference among the systems.

It should be noted that the present invention is not limited to the above-described embodiments. The embodiments are just examples, and any embodiments that substantially have the same feature and demonstrate the same functions and effects as those in the technical concept disclosed in claims of the present invention are included in the technical scope of the present invention.

The invention claimed is:

1. A method for measuring a wafer profile while holding a periphery of the wafer by using a flatness measurement system in which the wafer is placed, and which includes a first optical system and a second optical system respectively located on a first main surface and a second main surface of the wafer, the method comprising:
   a first step of measuring each of a surface variation on the first main surface and a surface variation on the second main surface of the wafer by using only one optical system of the first optical system and the second optical system, wherein
      the wafer is placed into the flatness measurement system to measure the surface variation on the first main surface with only the one optical system, and
      the surface variation on the second main surface is measured with only the one optical system such that the wafer is placed into the flatness measurement system while being reversed with respect to a state of the wafer placed to measure the surface variation on the first main surface;
   a second step of calculating a periphery-holding deformation amount, which is caused by holding the periphery of the wafer, through utilization of the surface variation on the first main surface and the surface variation on the second main surface measured with the one optical system, the second step comprising:
      acquiring a first thickness unevenness of the wafer, wherein
         the surface variation on the second main surface measured in the first step is corrected to acquire a corrected surface variation on the second main surface, and
         the first thickness unevenness is acquired from a difference between the surface variation on the first main surface measured in the first step and the corrected surface variation on the second main surface;
      acquiring a second thickness unevenness of the wafer from a difference between the surface variation on the first main surface measured with the one optical system and a surface variation on the second main surface measured with the other optical system; and
      acquiring the periphery-holding deformation amount, wherein
         an average value of the first thickness unevenness and an average value of the second thickness unevenness are calculated,
         a difference between the average value of the second thickness unevenness and the average value of the first thickness unevenness is added to the first thickness unevenness to acquire a revised first thickness unevenness, and
         a value that is ½ of a difference between the revised first thickness unevenness and the second thickness unevenness is set to the periphery-holding deformation amount; and
   a third step of calculating an actual Warp value of the wafer through subtraction of the periphery-holding deformation amount from a Warp value outputted by the flatness measurement system.

2. The method for measuring a wafer profile according to claim 1, wherein the wafer profile is measured by using more than one of the flatness measurement system.

* * * * *